(12) United States Patent
Le Calvez et al.

(10) Patent No.: US 11,907,942 B2
(45) Date of Patent: Feb. 20, 2024

(54) BLOCKCHAIN NETWORK RISK MANAGEMENT UNIVERSAL BLOCKCHAIN DATA MODEL

(71) Applicant: COIN METRICS INC., Cambridge, NJ (US)

(72) Inventors: Antoine J. M. Le Calvez, Treverec (FR); Lucas A. Nuzzi, New York, NY (US); Samuel Wyner, Albertson, NY (US); Kevin Julian Bornatsch, Jersey City, NJ (US); Salvatore Joseph Ternullo, Medford, MA (US)

(73) Assignee: COIN METRICS INC., Boston, MA (US)

( * ) Notice: Subject to any disclaimer, the term of this patent is extended or adjusted under 35 U.S.C. 154(b) by 463 days.

(21) Appl. No.: 17/245,161

(22) Filed: Apr. 30, 2021

(65) Prior Publication Data

US 2021/0342825 A1    Nov. 4, 2021

Related U.S. Application Data

(60) Provisional application No. 63/065,347, filed on Aug. 13, 2020, provisional application No. 63/019,135, filed on May 1, 2020.

(51) Int. Cl.
*G06Q 20/38*    (2012.01)
*G06F 21/55*    (2013.01)
*G06F 16/23*    (2019.01)
*G06Q 20/40*    (2012.01)

(52) U.S. Cl.
CPC ....... *G06Q 20/389* (2013.01); *G06F 16/2379* (2019.01); *G06F 21/554* (2013.01); *G06Q 20/4016* (2013.01); *G06F 2221/034* (2013.01); *G06Q 2220/00* (2013.01)

(58) Field of Classification Search
None
See application file for complete search history.

(56) References Cited

U.S. PATENT DOCUMENTS

| | | |
|---|---|---|
| 2019/0080411 A1 | 3/2019 | Pierce et al. |
| 2019/0370223 A1 | 12/2019 | Yang et al. |
| 2019/0370793 A1 | 12/2019 | Zhu et al. |
| 2020/0097953 A1* | 3/2020 | Islam ............... G06Q 20/3678 |
| 2020/0202343 A1* | 6/2020 | Shi .................... G06Q 20/389 |

(Continued)

OTHER PUBLICATIONS

G. Morganti, E. Schiavone and A. Bondavalli, "Risk Assessment of Blockchain Technology," 2018 Eighth Latin-American Symposium on Dependable Computing (LADC), Foz do Iguacu, Brazil, 2018, pp. 87-96, doi: 10.1109/LADC.2018.00019. (Year: 2018).*

(Continued)

*Primary Examiner* — Jacob C. Coppola
*Assistant Examiner* — Eduardo Castilho
(74) *Attorney, Agent, or Firm* — Hunton Andrews Kurth LLP

(57) ABSTRACT

The present invention is directed to a system and method that monitors a full spectrum of network risks associated with a crypto asset as well as its parent network. These risks are monitored in real-time and may include the risk of a blockchain reorganization event, unexpected inflation, abnormal fee behavior, network attacks, and forks. Combined, the innovative system supports settlement processes, risk controls and cybersecurity incident response.

22 Claims, 13 Drawing Sheets

(56) References Cited

U.S. PATENT DOCUMENTS

2020/0372511 A1* 11/2020 Zhang .................. G06Q 20/389
2020/0396251 A1* 12/2020 Chen ................... G06F 16/9024

OTHER PUBLICATIONS

C. Wang, X. Chu and Y. Qin, "Measurement and Analysis of the Bitcoin Networks: A View from Mining Pools," 2020 6th International Conference on Big Data Computing and Communications (BIGCOM), Deqing, China, 2020, pp. 180-188, doi: 10.1109/BigCom51056.2020.00032. (Year: 2020).*
Crypto51.app, "PoW 51% Attack Cost," captured on Apr. 21, 2020, 2020, from https://web.archive.org/web/20200421074428/https://www.crypto51.app/ (Year: 2020).*
Crypto51.app, "About," captured on Apr. 17, 2020, 2020, from https://web.archive.org/web/20200417104138/https://www.crypto51.app/about.html (Year: 2020).*
International Searching Authority, International Search Report and Written Opinion, International Application No. PCT/US21/30066, Aug. 3, 2021, pp. 1-8.
European Patent Office, European Application No. 21797220.7, Communication including the Extended European Search Report, dated Oct. 6, 2023, pp. 1-11.
Andreas M. Antonopoulos, "Mastering Bitcoin—Unlocking Digital Cryptocurrencies", O'Reilly Media, Beijing Cambridge Farmnham Koln Sebastopol Tokyo, Dec. 20, 2014, pp. 1-298.

* cited by examiner

BLOCKCHAIN NETWORK RISK MANAGEMENT UNIVERSAL BLOCKCHAIN DATA MODEL

CROSS-REFERENCE TO RELATED APPLICATIONS

The application claims priority to U.S. Provisional Application 63/065,347, entitled "Blockchain Network Risk Management Universal Blockchain Data Model," filed Aug. 13, 2020, the contents of which are incorporated herein by reference in their entirety. The application also claims priority to U.S. Provisional Application 63/019,135, entitled "Scalable and Advanced Analytics Computing Platform for Distributed Ledger Data," filed May 1, 2020, the content relating to consensus risk modeling illustrated in FIGS. 2D and 3C and corresponding supporting paragraphs are incorporated herein by reference.

This application is related to U.S. Provisional Application 63/065,345, entitled "Universal Blockchain Data Model," filed Aug. 13, 2020, the contents of which are incorporated herein by reference in their entirety.

FIELD OF THE INVENTION

The present disclosure relates to the field of blockchain technology, and in particular, to blockchain network, transaction and account risk monitoring.

BACKGROUND

Blockchain technology is an emerging technology in which many computing devices jointly participate in maintaining a distributed database or ledger. The ledgers or databases underpinning these distributed networks are referred to as blockchains. These blockchains are typically append-only and record every transaction that has taken place since inception. These networks have a native crypto asset, which is often algorithmically issued by the network as a reward to the computing devices (known as miners or block producers) that can successfully meet the requirements to append the ledger in a global competition.

Bitcoin is the first successful implementation of a blockchain with its own native crypto currency. It solved a fundamental problem in computer science expressed by Lamport, Shostak and Pease as the Byzantine Generals Problem (BGP), whereby consensus amongst parties that do not trust each other can be continuously reached if certain conditions are met. Bitcoin's Nakamoto Consensus, the solution to the aforementioned problem, and its underlying data structure gave birth to an entire industry as it demonstrated a novel way to issue assets and track settlement.

A fundamental property of Nakamoto Consensus that was key in solving the BGP is the ability for the ordering of blocks in the blockchain to be changed if certain conditions are met. The most common of such events are Chain Reorganizations, or "reorgs". When reorgs occur, certain transactions may be removed from the blockchain and sent back to a memory pool (or mempool) where unprocessed transactions are temporarily stored. A drawback of this system is that if fee conditions in the network change by the time such transactions return to the mempool, their final settlement might be impeded without additional action by users. Crypto asset exchanges have historically been impacted by this in terms of fee volatility, especially during the 2017 bull market.

The very same property also makes possible for network attacks, such as so-called "51% attacks," which is when an attacker attains enough hashing power to trigger reorgs for personal gain. While these attacks are not successfully performed on large networks like Bitcoin, smaller networks have been targeted. In most cases, crypto asset exchanges are the main targets of these attacks. By simply reverting exchange deposits, attackers have been able to net millions of dollars' worth of crypto assets. Unfortunately, like naturally occurring reorgs, exchanges have few resources to manage such risks and assess the likelihood of their transactions being affected.

SUMMARY

According to one embodiment, the invention relates to a system that implements blockchain network risk management. The system comprises: a data interface that communicates with a plurality of data sources through a communication network via an application programming interface, the plurality of data sources comprising relay protocols, client nodes, mining pool protocols and hashrate rental marketplaces, the data interface further comprising a data feed interface; and a chain monitor server coupled to the data interface and comprising a network processor, a settlement processor, a fee processor and an event processor; the chain monitor server further comprising a computer processor programmed to perform the steps of: receiving, via the data interface, transaction data from the plurality of data sources; accessing, via a mempool querying engine, data relating to unprocessed transactions stored in a memory pool; accessing, via a mining pool verifier, block hash data from a plurality of mining pools; accessing, via a hashrate price collector, rates data from one or more hashrate rental marketplaces relating to mining supply and demand information; based at least in part on the block hash data from the plurality of mining pools and the rates data from the one or more hashrate rental marketplaces, generating, by the network processor, a network attack risk that represents a risk of network disruption; based at least in part on the transaction data, generating, by the settlement processor, a settlement risk that includes one or more dynamic thresholds that reflect one or more events being experienced by a network that could prevent settlement; based at least in part on data relating to the unprocessed transactions stored in the memory pool, generating, by the fee processor, a fee volatility risk that identifies an abnormal change in one or more of: mempool transaction fees and mempool transaction count; based at least in part on the transaction data, generating, by the event processor, a network event alert that represents unexpected inflation in real-time; and generating, via an interactive user interface, at least one alert that represents an indication of risk comprising a combination of the network attack risk, the settlement risk, the fee volatility risk and the unusual network event risk.

According to another embodiment, the invention relates to a method that implements blockchain network risk management. The method comprises the steps of: receiving, via a data interface, transaction data from a plurality of data sources, wherein the data interface communicates with the plurality of data sources through a communication network via an application programming interface, the plurality of data sources comprising relay protocols, client nodes, mining pool protocols and hashrate rental marketplaces, the data interface further comprising a data feed interface; accessing, via a mempool querying engine, data relating to unprocessed transactions stored in a memory pool; accessing, via a mining pool verifier, block hash data from a plurality of mining pools; accessing, via a hashrate price collector, rates data from one or more hashrate rental marketplaces relating to mining supply and demand information; based at least in part on the block hash data from the plurality of mining pools and the rates data from the one or more hashrate rental marketplaces, generating, by a network processor, a network attack risk that represents a risk of network disruption; based at least in part on the transaction data, generating, by a settlement processor, a settlement risk that includes one or more dynamic thresholds that reflect one or more events being experienced by a network that could prevent settlement; based at least in part on data relating to the unprocessed transactions stored in the memory pool, generating, by a fee processor, a fee volatility risk that identifies an abnormal change in one or more of: mempool transaction fees and mempool transaction count; based at least in part on the transaction data, generating, by an event processor, a network event alert that represents unexpected inflation in real-time; and generating, via an interactive user interface, at least one alert that represents an indication of risk comprising a combination of the network attack risk, the settlement risk, the fee volatility risk and the unusual network event risk.

The present invention provides a system and method for monitoring the full spectrum of network risks faced by a crypto asset as well as its parent network. These risks are monitored in real-time and include the risk of a blockchain reorganization event, unexpected inflation, abnormal fee behavior, network attacks, and forks. Combined, the innovative monitoring system supports settlement processes, risk controls and cybersecurity incident response.

An embodiment of the present invention is directed to enhancing institutional risk management in crypto networks. Business value benefits may include optimizing operations, improving client support, managing network risk, preventing/mitigating cyber theft and enhanced responses to cyber threats. Optimized operations include improved transaction fee estimates, increased operational privacy and implementation of dynamic confirmation times. Improved client support relate to tracking transaction settlement in real-time, responding to network congestion and assessing the impact of stale blocks. Network risk management includes detecting 51% attack or network forks, identifying exploited inflation bugs and monitoring overall network health. Cyber theft prevention or mitigation may be realized through dis-incentivized cyber attacks, reconciled transaction and off-chain policies and the ability to distinguish unusual market activity. Improved responses to cyber threats include detecting exploits at the mempool level, managing double spends and clawbacks and tracking network ramifications.

These and other advantages will be described more fully in the following detailed description.

BRIEF DESCRIPTION OF THE FIGURES

These and other characteristics of the present invention will be more fully understood by reference to the following detailed description in conjunction with the attached drawings.

DETAILED DESCRIPTION

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

Figure 1:
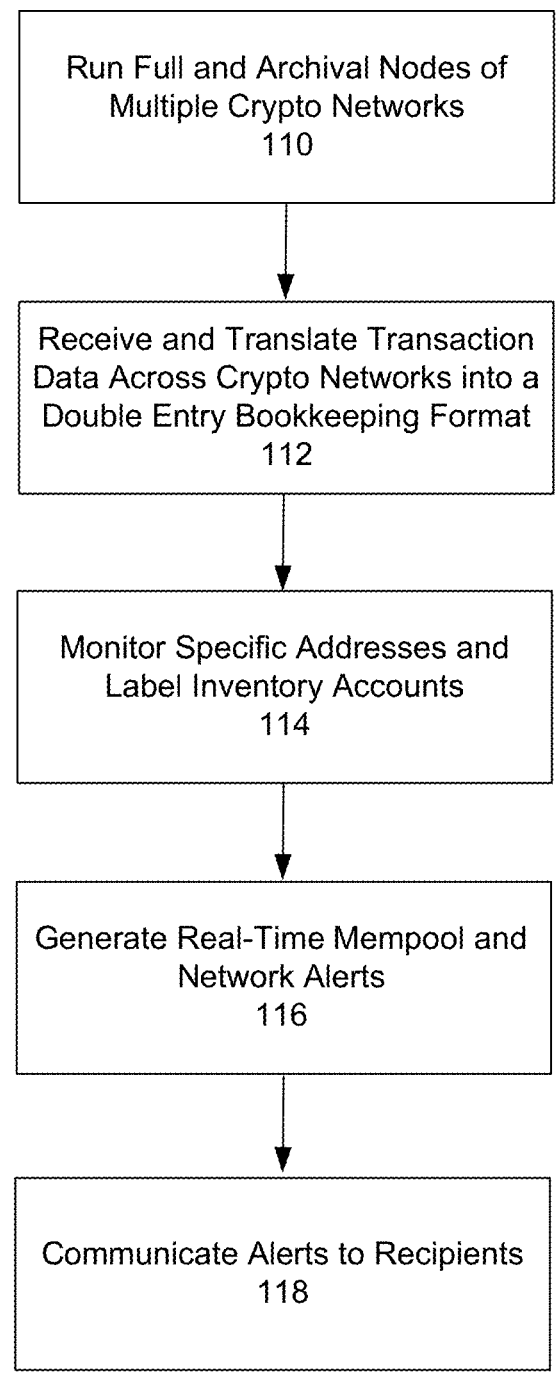
FIG. 1 is an exemplary flowchart illustrating blockchain network risk management, according to an embodiment of the present invention.

FIG. 1 is an exemplary flowchart illustrating blockchain network risk management, according to an embodiment of the present invention. At step 110, a service provider may run full and archival nodes of a plurality of crypto networks. At step 112, transaction data from the crypto networks may be received and translated into a format, such as a Double Entry Bookkeeping format. For example, data translation may be performed using a Universal Blockchain Data Model. At step 114, users may monitor specific addresses and label inventory accounts as reserves, withdrawals as payables, etc. At step 116, based on the monitored data, alerts may be generated. For example, alerts may include real-time mempool and network alerts. At step 118, the alerts may be transmitted to inform recipients about unauthorized withdrawals, settlement problems, network issues, etc. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

Figure 2:
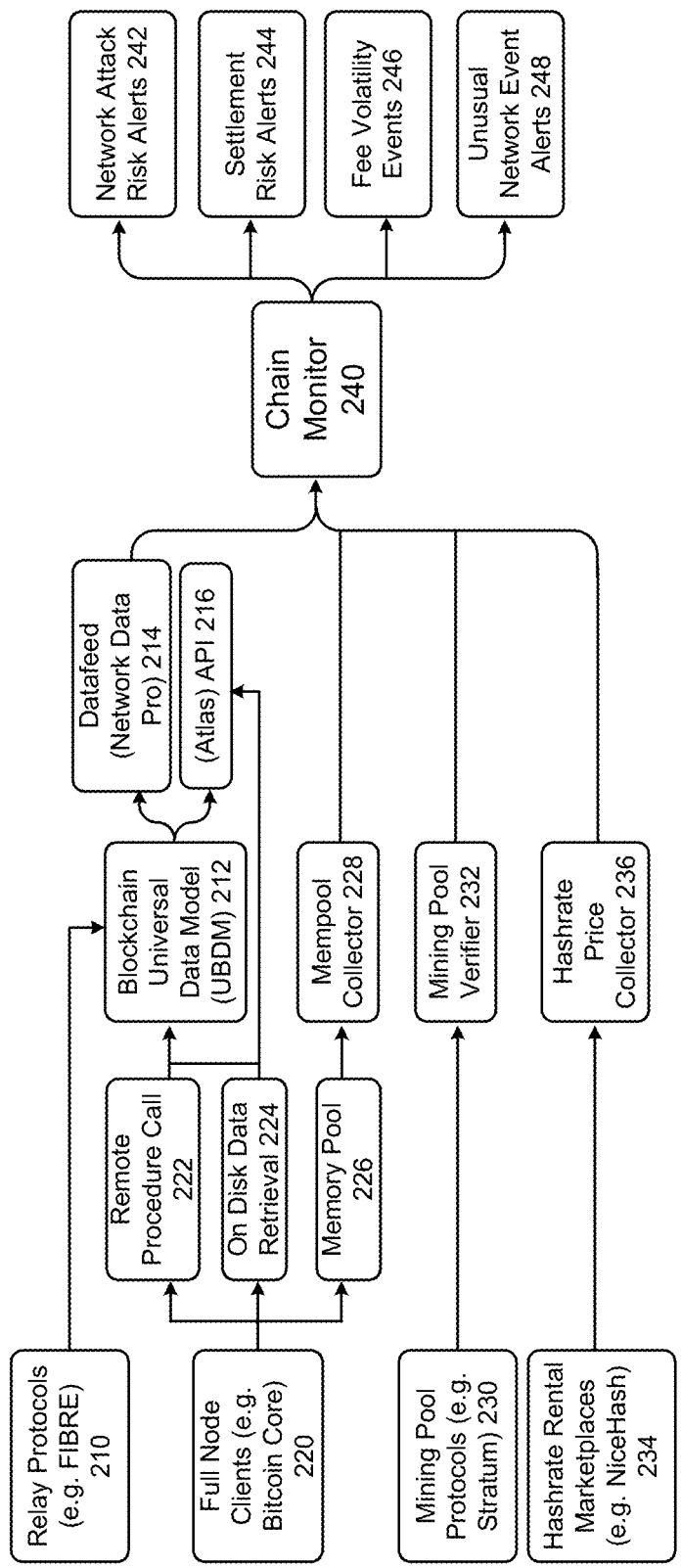
FIG. 2 is detailed overview of data flow elements of the blockchain network risk management, according to an embodiment of the present invention.

FIG. 2 is detailed overview of data flow elements of the blockchain network risk management, according to an embodiment of the present invention. Chain Monitor 240 represents a server, processor or system that executes a service that generates risk analytics and metrics. Chain Monitor 240 provides a comprehensive approach to blockchain network risk management. It further enables users to identify network attacks, double spends, blockchain splits, market abnormalities, etc. Chain Monitor 240 may be realized in various implementations including through an API. For example, Chain Monitor 240 may represent a blockchain risk management API designed to alert network participants of a wide spectrum of network events that may impact transaction settlement and other events.

Chain Monitor 240 receives data from multiple data sources, applies data formatting, performs risk analysis and generates alerts relating to network risks, settlement risks, fee volatility events and unusual network activity risks. Data sources may include relay protocols, full node clients, mining pool protocols and marketplaces. These representative sources provide a comprehensive view on processed and unprocessed transactions from which alerts may be created. Data may be formatted, collected and verified for risk analysis and determination.

As shown in FIG. 2, an embodiment of the present invention may implement various nodes of crypto networks. For example, nodes may include Relay Protocols 210 and Full Node Clients 220. An exemplary Relay Protocol may include FIBRE (Fast Internet Bitcoin Relay Engine) and other protocol or implementation designed to relay blocks within a network of nodes. Full Node Clients 220 may represent a node that fully validates transactions and blocks. Other nodes may include Mining Pool Protocols 230 and Hashrate Rental Marketplaces 234. Mining Pool Protocol may include Stratum and other mining communication protocols used by blockchain based crypto currency systems that enable miners to reliably and efficiently fetch jobs from mining pool servers. Hashrate Rental Marketplace 234 may represent a marketplace where buyers can select crypto currency they want to mine, a pool on which they want to mine, set the price they are willing to pay and place an order. An exemplary Hashrate Rental Marketplace may include NiceHash or other open marketplace that connects sellers or miners of hashing power with buyers of hashing power. Other nodes and/or blockchain data sources may be supported.

Data from Full Node Clients 220 may be received by Remote Procedure Call 222, On Disk Data Retrieval 224 and/or Memory Pool 226. Remote Procedure Call 222 may represent a set of protocols and interfaces that enables a client to interact with a blockchain network and retrieve data in a structured format, often in the JavaScript Object Notation (JSON) format. On Disk Data Retrieval 224 may represent a mechanism for retrieving remote data. Memory Pool 226 may represent a mempool or other mechanism for storing information on unconfirmed transactions. After a transaction is verified by a node, the transaction may wait in Memory Pool 226 until it is accessed by a miner and inserted into a block. The size of Memory Pool 226 may provide an indication of network traffic, average confirmation time and priority fees.

Raw data on processed transactions across various supported networks may be provisioned via Universal Blockchain Data Model (UBDM) 212 and accompanying Datafeed 214 and/or API 216. By implementing UBDM 212, specific addresses may be monitored.

As shown in FIG. 2, data from sources, such as Relay Protocols 210 and Full Node Clients 220, may be received and translated into a format via Blockchain Universal Data Model (UBDM) 212 which is then received by Datafeed 214 and API 216. The details of Blockchain Universal Data Model (UBDM) are provided in co-pending U.S. Provisional Application 63/065,345, entitled "Universal Blockchain Data Model," filed Aug. 13, 2020, the contents of which are incorporated by reference in their entirety. UBDM provides correct sequencing of transactions and a universal underlying format. Moreover, intricacies of each blockchain may be represented as a generalized model where transactions are restructured as sets of debits and credits applied to accounts. According to an embodiment of the present invention, UBDM translates various blockchain concepts into double entry bookkeeping concepts by creating at least two types of accounts: (1) user accounts and (2) virtual accounts, such as issuance accounts and fee accounts.

Datafeed 214 provides insightful, aggregate network data metrics for crypto assets. For example, Datafeed 214 may aggregate on-chain data for analysis and trading. Datafeed 214 may support multiple feeds, including Daily Macro (end of day) and Block-by-Block (real-time). Datafeed 214 may support on-chain datasets for analyzing crypto assets. Other features may include: tracking macro trends, building valuation models of trading strategies and monitoring blockchain health and activity in real-time. Datafeed 214 may represent Coin Metrics Network Data Pro (NDP) which supports on-chain blockchain metrics, including transaction count, address counts, velocity. These metrics may be calculated with data directly sourced from the blockchain via Remote Procedure Call 222, whose format may be further enriched via the Universal Blockchain Data Model (UBDM) 212.

API 216 provides access to UBDM 212. For example, API 216 provides a uniform way to query data from various blockchain full nodes using double entry bookkeeping format, e.g., UBDM. In addition, API 216 may enable a blockchain search engine to look up information on transactions, addresses and blocks. API 216 may represent Coin Metrics universal blockchain explorer Atlas, which is an API that provisions data that has been converted to the Universal Blockchain Data Model (UBDM) 212. In certain blockchains, Atlas API 216 may provision data sourced directly from the blockchain via Remote Procedure Call 222, or sourced through On Disk Data Retrieval 224.

Memory Pool 226 provides data that is validated, enriched and stored by the Mempool Collector 228, a low-latency mempool querying engine. Chain Monitor 240 employs Mempool Collector 228 to provide data and alerts on the health of a blockchain's memory pool as well as granular information on unprocessed transactions.

Given the wide spectrum of risks faced by blockchain network covered by this system, Chain Monitor 240 looks beyond transactional data siloed in a crypto asset's peer-to-peer network. An embodiment of the present invention recognizes that observing mining pool protocols provides a view on future blocks. As shown in FIG. 2, Mining Pool Verifier 232 may connect to several mining pools via the Stratum protocol (represented by Mining Pool Protocols 230) to obtain information about blocks being mined and/or impending network attacks. To validate potential attack vectors and/or ongoing attacks, Chain Monitor 240 also sources data from Hashrate Price Collector 236 and Hashrate Rental Marketplaces 234 which provide a view on mining supply and demand for specific networks.

Based on data sources in various combinations, Chain Monitor 240 may then provide alerts through various risk assessment modules. Alerts may include Network Attack Risk Alerts 242, Settlement Risk Alerts 244, Fee Volatility Events 246 and Unusual Network Event Alerts 248.

Figure 3:
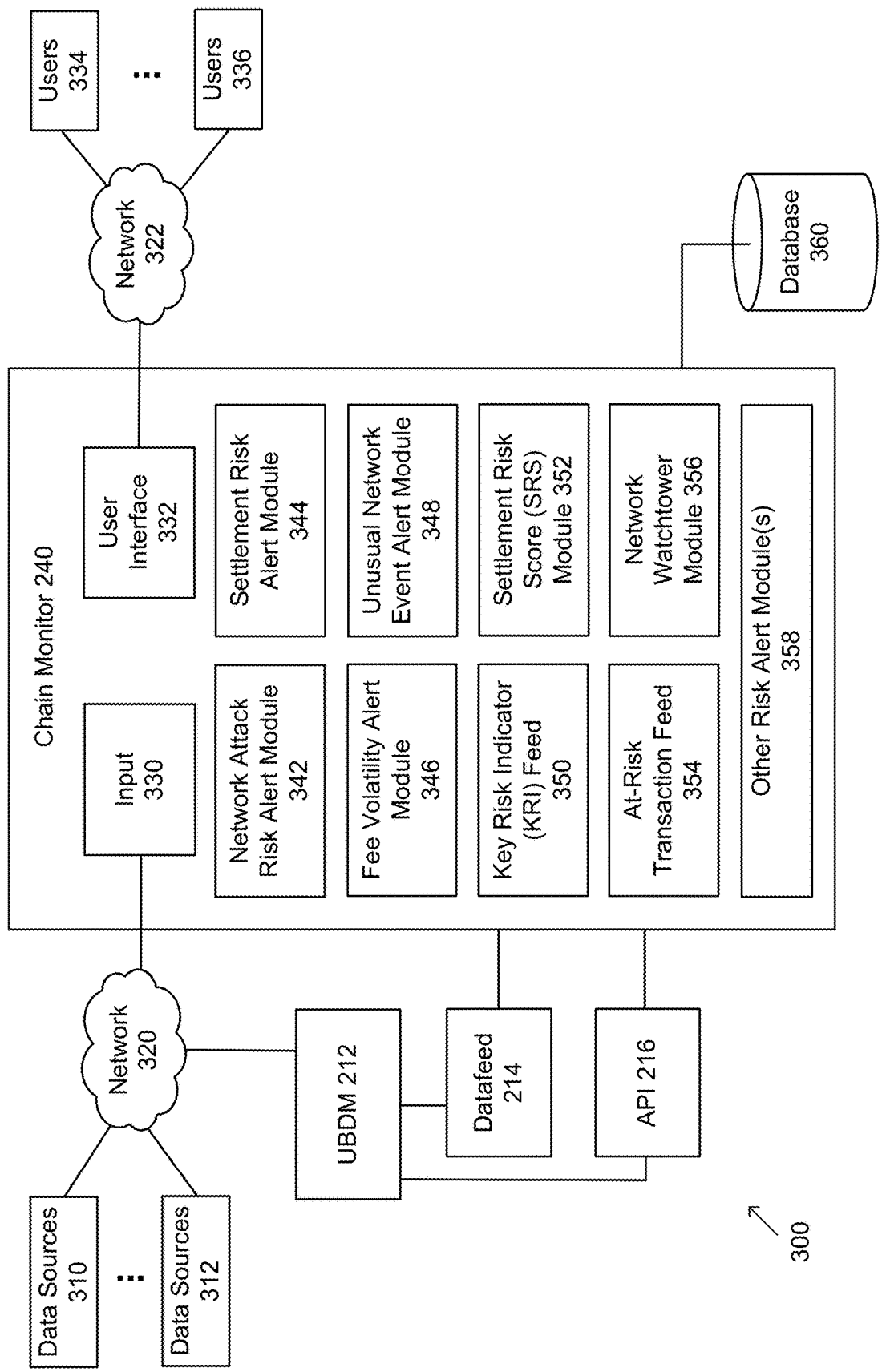
FIG. 3 is an exemplary system diagram that provides blockchain network risk management, according to an embodiment of the present invention.

FIG. 3 is an exemplary system diagram that provides blockchain network risk management, according to an embodiment of the present invention. Chain Monitor 240 may comprise an Input 330 that receives data from various data sources represented by 310, 312 via Network 320. Data may represent transaction data. The received data may be formatted and transformed through a data model represented by UBDM 212 which communicates through Datafeed 214 and/or API 216.

Chain Monitor 240 may include User Interface 332 that provides alerts and supporting analytics to various recipients represented by Users 334, 336 through Network 322.

User Interface 332 may represent an interface (such as a GUI) that enables a user to interact with Chain Monitor 240. A user may receive alerts and other information from Chain Monitor 240 through a mobile device, computer system and other device with a computer processor. User Interface 332 may include any hardware, software, or combination of hardware and software used by a processor that allows a user to interact with the processor of the communication device. A user interface may be in the form of a dialogue screen provided by an application, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Networks 320 and 322 may represent a wireless network, a wired network or any combination of wireless network and wired network. Networks 320 and 322 may utilize one or more protocols of one or more network elements to which it is communicatively coupled. Networks 320 and 322 may translate to or from other protocols to one or more protocols of network devices. Although Networks 320 and 322 are depicted as one network for simplicity, it should be appreciated that according to one or more embodiments, Network 202 may comprise a plurality of interconnected networks, such as, for example, a service provider network, the Internet, a cellular network, corporate networks, or even home networks, or any type of network.

Chain Monitor 240 may include processors and/or other components that support risk management functionality represented by Network Attack Risk Alert Module 342, Settlement Risk Alert Module 344, Fee Volatility Alert Module 346, Unusual Network Event Alert Module 348, Key Risk Indicator (KRI) Feed 350, Settlement Risk Score (SRS) Module 352, At-Risk Transaction Feed 354 and Network Watchtower Module 356. Other risk management functionality may be represented by Other Risk Alert Module(s) 358. The various modules provide a holist and customizable way to monitor network risk. These modules are exemplary and illustrative, Chain Monitor 240 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, Chain Monitor 240 may implement various subsets of modules in numerous combinations to support uses cases, applications and environments as needed. Other architectures may be realized.

The system 300 of FIG. 3 may be implemented in a variety of ways. Architecture within the system 300 may be implemented as hardware components (e.g., module) within one or more network elements. It should also be appreciated that architecture within system 300 may be implemented in computer executable software (e.g., on a tangible, non-transitory computer-readable medium) located within one or more network elements. Module functionality of architecture within system 300 may be located on a single device or distributed across a plurality of devices including one or more centralized servers and one or more mobile units or end user devices. The architecture depicted in system 300 is meant to be exemplary and non-limiting. For example, while connections and relationships between the elements of system 300 is depicted, it should be appreciated that other connections and relationships are possible. The system 300 described below may be used to implement the various methods herein, by way of example. Various elements of the system 300 may be referenced in explaining the exemplary methods described herein.

Network Attack Risk Alert Module 342 tracks data points that signal incoming and/or ongoing network attacks. Network risk generally relates to risk of network disruption. This may include blockchain network risk, specifically Bitcoin, Ethereum, etc. Network attack risk alerts may relate to 51% attacks, rapid/slow block alerts, and other network disruptions or events.

Settlement Risk Alert Module 344 assesses data points to generate dynamic thresholds that reflect events being experienced by a network. Settlement risk alerts may relate to stale block candidates, empty blocks, and other events that prevent or hinder settlement.

Fee Volatility Alert Module 346 generates notifications relating to fee level prediction. Fee volatility alerts may relate to abnormal changes in mempool fees, abnormal mempool counts, etc.

Unusual Network Event Alert Module 348 tracks events representing unexpected inflation in real-time and warns users of potential network disruptions. Unusual network event alerts may relate to unexpected inflations, Whale transactions and other events that have the potential to manipulate currency valuations.

Key Risk Indicator (KRI) Feed 350 represents a real-time feed featuring dozens of risk metrics that enables clients to build custom network risk dashboards. KRI Feed 350 provides a way to attain a complete view of the health of a network and proactively adjust to network conditions. KRI Feed 350 may be used by other risk modules.

Settlement Risk Score (SRS) Module 352 represents a score that reflects the likelihood of settlement in real-time, ranging from 0 (likely to settle) to 5 (unlikely to settle). The score may be represented on other scales, graphics and indicators. Settlement Risk Score uses the KM feed to contextualize Network Risk and estimate the likelihood of a transaction settling. An embodiment of the present invention promotes a full and comprehensive awareness of network conditions before broadcasting a transaction via a contextualized scoring system.

At Risk Transaction Feed 354 represents a real-time feed of transactions that may have been impacted by risk factors which can prevent settlement. This provides real-time transaction monitoring and alerting without the need to share addresses or identifiers (e.g., transaction ID (txids)). For example, At Risk Transaction Feed 354 may identify transactions at risk of not settling as a result of stale blocks, vulnerability exploits, etc.

Network Watchtower Module 356 provides a monitoring and notification service for specific transactions and potential security breaches. This may be realized as a highly performant tool to support multiple custody operations, from customer support to cybersecurity incident response. Network Watchtower Module 356 may monitor the settlement of specific transactions at both the blockchain and the mempool levels. Additionally, Network Watchtower Module 365 may monitor the custody policies of its users to detect security breaches. For example, if a user's custody policy states that no single transaction can withdraw the entire balance of a user account, and the Network Watchtower Module 356 is aware of this policy, an embodiment of the present invention may alert users if such a transaction is identified.

Data may be stored and managed at Database 360. Database 360 may represent one or more storage components that includes any suitable data structure to maintain the information and allow access and retrieval of the information. The storage may be local, remote, or a combination. The storage components may also represent cloud or other network based storage. Communications with the storage components may be over a network or communications may involve a direct connection between the various storage components and Chain Monitor 320, as depicted in FIG. 3.

The various embodiments of the present invention improves operations through precise fee estimation and optimal transaction timing. Additional insights may be provided through settlement management and monitoring. An embodiment of the present invention improves network risk management through alerts including hidden inflation and double spend alerts. Additional benefits may be realized through network uptime and vulnerability monitoring. Cybersecurity situation awareness and response may be enhanced through real-time breach detection, breach response via replace by fee or other on-chain mechanism and integration with security workflows.

Network Attack Risk Alert Module 342 keeps track of several data points that when combined may signal incoming and/or ongoing network attacks, such as 51% attacks. In such instances, attackers attempt to take over the network by monopolizing the mining process, which enables them to revert, censor and/or duplicate transactions. In order to measure the likelihood of these attacks, Network Attack Risk Alert Module 342 sources block hash data from mining pools and rates from hashrate rental marketplaces. Tracking mining pools allows Chain Monitor 240 to track incoming blocks before they are broadcasted whereas prices in rental marketplaces paint a picture of mining demand for a specific crypto network. When combined, a more complete view of a protocol's mining ecosystem and accompanying market conditions may be attained.

Hashrate Rental Marketplaces 234 may represent venues where miners rent their specialized hardware or machines, such as application-specific integrated circuits (ASICs) and graphics processing unit (GPU) rigs, to third parties. No actual hardware exchange takes place, but renters may direct specialized hashpower to specific pools and control the work being performed by the rented machines. Oftentimes, this may involve only mining one or few crypto asset networks. Since hashrate available for rent in such marketplaces is simply priced by supply and demand, an embodiment of the present invention is directed to assessing the cost of performing such attacks. Further, if an uptick in demand for a specific type of hashrate is observed without supporting evidence for such demand in the underlying network, an increase in rental prices may be driven by an attacker attempting to perform a 51% attack.

As the mining industry evolves, mining pool venues and mining protocols continue to play a central role in the validation of crypto asset transactions. As such, it is increasingly rare for miners to attempt to operate by themselves. By joining mining pools via protocols like Stratum, a miner's chance of profitability is increased as hashrate resources are pooled together. If the pool is successful, all constituents share the reward based on the proportion of hashrate individually contributed. Mining pool constituents have few interactions amongst themselves and, under existing protocols, the operator of the pool is solely responsible for deciding which transactions will be included in the block all constituents work on.

By connecting to mining protocols such as Stratum, Network Attack Risk Alert Module 342 may source information on the work being performed across various major mining pools. Doing so enables an embodiment of the present invention to receive information as if it were a miner. Therefore, it is able to identify discrepancies between mining pools. If, for example, a mining pool is working on an unknown version of the blockchain that is at odds with all other pools, that pool might be orchestrating a 51% attack, as observed in the past with other known 51% attacks. Accordingly, this may be assessed by specifically looking at a parent hash listed on a currently mined block and comparing that hash against all other mining pools.

Settlement Risk Alert Module 344 assesses a variety of data points to provide dynamic thresholds that reflect events being experienced by a network in any given time. Given the ability under Nakamoto Consensus to reorganize the ordering and composition of blocks in a blockchain, transaction settlement can be subjective. As an industry best practice, a number of six blocks may be required to confirm atop a Bitcoin block prior to all transactions within to be deemed valid. While the industry has converged on confirmation periods ranging from three to six blocks, these thresholds are often arbitrarily set by market participants.

In certain cases, the delay between blocks may differ from target creation times considerably. For example, in Bitcoin, the target block creation time is 10 minutes. However, there have been instances where blocks were found both in a matter of a few seconds and in matter of hours. While both extremes are probable given that mining follows a Poisson process, a consistent bias for shorter or longer block creation times may be indicative of more serious factors impacting the network. If for any reason a considerable portion of miners suddenly goes offline, block creation time is expected to increase up until the protocol readjusts the parameters for mining difficulty, which may take up to two weeks. In such unusual cases, Settlement Risk Alert Module 344 alerts participants and provides an appropriate confirmation threshold.

Another event that might impact transaction settlement may include an occurrence of stale blocks. As mentioned earlier, these are blocks that were previously considered valid, but ultimately discarded in favor of a competing branch of the blockchain. An intrinsic component of Nakamoto Consensus, stale blocks are events that require constant vigilance, especially by crypto asset exchanges, since they may render sets of deposits and withdrawals invalid. The Settlement Risk Alert module notifies market participants of these events and monitors the convergence on a single blockchain. Further, an alerting system of an embodiment of the present invention contextualizes such events by showcasing specific addresses provided by clients that may be impacted by a stale block.

Fee Volatility Alert Module 346 issues notifications when fee parameters for certain transactions need to be changed by measuring fee levels of previously mined blocks, as well as fees of unprocessed transactions in the memory pool. This provides a probabilistic perspective on the fee levels required in order for a transaction to be included in the next block. By monitoring volatility both in the market and network, drastic changes in fee parameters may be predicted and market participants may be alerted accordingly.

An embodiment of the present invention recognizes that market volatility often carries noticeable impacts on crypto asset networks that support the volatile asset. Accordingly, oscillations in fees require monitoring so that market participants can align settlement time expectations with transaction fee expenditures. This is especially important when stale blocks take place and a large portion of transactions is sent back to the memory pool. If fee conditions have changed from the time these transactions were broadcasted, senders engage in a technique called Replace By Fee (RBF), which enables fee levels to be adjusted.

Unusual Network Event Alert Module 348 tracks events such as unexpected inflation in real-time. Since an exploited inflation bug would likely be reorged out of the blockchain, this alert notifies users of potential network disruptions.

Over a 10-year history, there have been unusual events that disrupted blockchain networks. Inflation bugs, for example, may be characterized as unexpected and unauthorized inflation. Although such bugs have been inadvertently introduced via software updates, they can be identified prior to any exploit.

Key Risk Indicator (KRI) Feed 350 represents a real-time feed featuring risk metrics that enable clients to build custom network risk dashboards. Given the wide range of crypto network implementations, certain KRIs are only available to specific crypto asset types. For example, the concept of Proof-of-Work mining is not applicable to Proof-of-Stake networks.

KRI may include a set of metrics that relate to certain assets (e.g., Bitcoin (BTC), Ethereum (ETH), Litecoin (LTC), Zcash (ZEC), DASH, Bitcoin Cash (BCH), Tron (TRX), Ripple (XRP), Wrapped Bitcoin (WBTC)). Each metric may be associated with an alert type (e.g., Mining Pool, Blockchain, Mempool, etc.).

Metrics relating to Mining Pools may include: "mining reward mean", "mining reward spread" and "mining active chains count."

"mining reward mean" represents a mean mining reward (e.g., transaction fees+issuance) of the blocks currently being mined across all major mining pools, in native units (e.g. units of BTC). An embodiment of the present invention collects data from major mining pools through a protocol, such as the Stratum protocol used by individual miners to connect to mining pools. This provides access to all data a mining pool constituent would normally see. In order to compute this metric, the transactions of all blocks currently being worked on by major mining pools are aggregated and assessed. The statistical mean is then calculated. This metric is available to Bitcoin, Litecoin and Bitcoin Cash.

"mining reward spread" represents the difference between the highest and lowest miner reward of the blocks being mined by the major mining pools. An embodiment of the present invention collects data from major mining pools through a protocol, such as the Stratum protocol used by individual miners to connect to pools. This provides access to all data an individual constituent of a mining pool would normally receive. In order to compute this metric, the transactions of all blocks currently being worked on by major mining pools are aggregated and assessed. The difference between the highest and lowest transaction is then calculated. This metric is available to Bitcoin, Litecoin and Bitcoin Cash.

"mining active chains count" represents a count of all versions of the blockchain currently being worked on across major mining pools. An embodiment of the present invention collects data from major mining pools through a protocol, such as the Stratum protocol used by individual miners to connect to pools. This provides access to all data an individual constituent of a mining pool would normally receive. In order to compute this metric, the previous block hashes from all blocks from major mining pools are collected. This metric reflects how many different versions of previous block hashes have been identified. This metric is available to Bitcoin, Litecoin and Bitcoin Cash.

Metrics relating to Blockchain may include: "block count at tip", "block count empty 6b", "block count without segwit 6b", "block count by same miner 6b", "block difficulty", "block difficulty change", "block fees (FeeTotNtv)", "block hashrate mean 1d", "time inter block", "time since last block" and "block count by unknown miners 6b."

"block count at tip" reflects the number of blocks identified at the tip of the blockchain. If there exists more than one block, the network may converge on a single block at that height. When such events take place, transactors must be aware that their transactions may take longer to settle if they were only included in the block that was ultimately discarded. Such blocks are called "stale blocks." The block(s) at the chain tip may be indexed by block hash and height. Blocks with distinct block hashes are counted. This metric is available to Bitcoin (BTC), Bitcoin Cash (BCH) and Litecoin (LTC).

"block count empty 6b" represents the number of empty blocks in the past 6 blocks. Empty blocks are blocks that do not contain any transactions other than a coinbase transaction, which is often the transaction that grants a network's miner newly minted monetary units in exchange for successfully appending the blockchain with a new, valid block. They may be a result of no underlying economic activity leading to no user transactions to mine, or they can be a result of a deliberate action by miners. There are incentives for miners to work on empty blocks. Since empty blocks consume less space, they may be propagated faster. Additionally, empty blocks can increase fees in times of vibrant network activity, as unprocessed transactions accumulate. If persistent, empty blocks may be very disruptive to a network. The 6 blocks from the tip of the blockchain (including the most recent block) are assessed, and the number of empty blocks counted. This metric is available to Bitcoin (BTC) and Litecoin (LTC). For this metric, 6 blocks is representative. Other number of blocks may be applied.

"block count without segwit 6b" represents the number of blocks without Segregated Witness (SegWit) transactions in the past 6 blocks. The 6 blocks from the tip of the blockchain (including the most recent block) are assessed, and the number of blocks without SegWit transactions is counted. This metric is available to Bitcoin (BTC), Ethereum (ETH), Bitcoin Cash (BCH), Litecoin (LTC), Zcash (ZEC), DASH, Tron (TRX), Ripple (XRP) and Wrapped Bitcoin (WBTC). For this metric, 6 blocks is representative. Other number of blocks may be applied.

"block count by same miner 6b" represents the number of blocks by the same miner in the past 6 blocks. The 6 blocks from the tip of the blockchain (including the most recent block) are assessed, and the number of blocks mined by the same miner are counted. For Bitcoin (BTC), 6 blocks is representative. Other number of blocks maybe applied to other networks.

"block difficulty" represents the difficulty of the last block in the blockchain. Difficulty represents how hard it is to find a hash that meets a protocol-designated requirement (e.g., the difficulty of finding a new block). The requirement may be unique to each applicable crypto currency protocol. Difficulty may be adjusted periodically by the protocol as a function of how much hashing power is being deployed by miners. Difficulty may represent a protocol-defined metric that can be obtained natively. As such, the methodology is handled by the protocol. This metric is available to Bitcoin (BTC), Ethereum (ETH), Bitcoin Cash (BCH), Litecoin (LTC), Zcash (ZEC) and DASH.

"block difficulty change" represents the latest change in network difficulty. Difficulty represents how hard it is to find a hash that meets the protocol-designated requirement (e.g., the difficulty of finding a new block). The requirement may be unique to each applicable crypto currency protocol. Difficulty may be adjusted periodically by the protocol as a function of how much hashing power is being deployed by miners. Difficulty may represent a protocol-defined metric that can be obtained natively. As such, the methodology is handled by the protocol. Difficulty change is calculated by subtracting the current block difficulty by the difficulty of the previous block. This metric is available to Bitcoin (BTC), Ethereum (ETH), Bitcoin Cash (BCH), Litecoin (LTC), Zcash (ZEC) and DASH.

"block fees (FeeTotNtv)" represents the sum of fees paid to miners for the transactions included in each mined block. The notation FeeTotNtv stands for "Total Fees in Native Units" as used in Network Data Pro represented by Datafeed 214. The most recently-mined block is evaluated and the sum of fees in that block is computed. This metric is available to Bitcoin (BTC), Ethereum (ETH), Bitcoin Cash (BCH), Litecoin (LTC), Zcash (ZEC) and DASH.

"block hashrate mean 1d" represents the mean hash rate needed to mine a block based on data from a time period, e.g., previous 24 hrs. Hash rate represents the speed at which computations are being completed across all miners in the network, in hashes per second. Hash rate is derived from difficulty (DiffMean), the rate at which block came in (BlkIntMean) and depending on the protocols, some other pieces of data. This metric gives an estimate of how much hash power is mining a given chain. This metric is available to Bitcoin (BTC), Ethereum (ETH), Bitcoin Cash (BCH), Litecoin (LTC), Zcash (ZEC) and DASH. For this metric, 1 day or 24 hours is representative. Other durations may be applied.

"time inter block" represents the time elapsed between the block at the tip of the chain (the most recent block) and its predecessor. The metric is computed as the time difference between the arrival of the block at the chain tip as seen by our nodes, and the arrival of the previous block. This metric is available to Bitcoin (BTC), Ethereum (ETH), Bitcoin Cash (BCH), Litecoin (LTC), Zcash (ZEC) and DASH.

"time since last block" represents the time elapsed since the most recent block in a blockchain has been found, in seconds or other unit of time. Blockchain networks have algorithms that provide a target time for the interval between blocks. The Bitcoin protocol, for example, targets a 10-minute inter block creation time. Large variations from that target take place may be indicative of network attacks, the exploitation of software bugs, or drastic changes in the operations of network miners.

"block count by unknown miners 6b" represents the count of blocks that have been mined by unknown miners 6 blocks from the tip of the blockchain. The 6 blocks from the tip of the blockchain (including the most recent block) are assessed. An embodiment of the present invention may employ an entity clustering methodology in order to identify major mining pools and miners. For example, an output field used by miners to self-identify is also used to help assess miner identities. This metric is available to Bitcoin (BTC) and Ethereum (ETH). For this metric, 6 blocks is representative. Other number of blocks may be applied.

Metrics relating to Mempool may include: "mempool count", "mempool count entered 1m", "mempool fee", "mempool fee entered 1m", "mempool fee mean entered 1m", "mempool feerate mean", "mempool feerate median", "mempool output value", "mempool output value entered 1m", "mempool vsize", "mempool vsize entered 1m" and "mempool vsize left 1m."

"mempool count" represents the count of all mempool transactions at a point in time. For example, the mempool is evaluated and all transactions indexed. All unprocessed mempool transactions at a point in time are then counted. This metric is available to Bitcoin (BTC).

"mempool count entered 1m" represents the count of all transactions that have entered the mempool over the course of a 1-minute aggregation window. The beginning of this time window is noted in the "time" field of the response. The mempool is evaluated and all transactions that have entered (new transactions broadcasted by users) since a point in time are counted. This metric is available to Bitcoin (BTC). For this metric, 1 minute is representative. Other time windows may be applied.

"mempool fee" represents the sum value of all mempool transaction fees at a point in time in native units. The mempool is evaluated and all transactions indexed. The value of all transaction fees within these unprocessed transactions is then summed. This metric is available to Bitcoin (BTC).

"mempool fee entered 1m" represents the sum value of all mempool transaction fees for all transactions entering the mempool over the course of a 1-minute aggregation window. The beginning of this time window is noted in the "time" field of the response. The mempool is evaluated and the fees attached to all transactions that have entered (new transactions broadcasted by users) in the previous 1 minute interval are counted. This metric is available to Bitcoin (BTC). For this metric, 1 minute is representative. Other time windows may be applied.

"mempool fee mean entered 1m" represents the mean value of the fees paid for all transactions entering the mempool over the course of a 1-minute aggregation window. The beginning of this time window is noted in the "time" field of the response. The mempool is evaluated and the fees attached to all transactions that have entered (new transactions broadcasted by users) in the previous 1 minute interval are aggregated. The statistical mean of these fees is then calculated. This metric is available to Bitcoin (BTC). For this metric, 1 minute is representative. Other time windows may be applied.

"mempool feerate mean" represents the mean feerate (fee/vsize) of all mempool transactions, in native units per byte. Virtual Size (vsize) is a unit used to measure the size of a bitcoin transaction after the activation of SegWit. The mempool is evaluated and the feerate (fee/vsize) attached to all transactions is aggregated. The mean feerate of all transactions is then calculated. This metric is available to Bitcoin (BTC).

"mempool feerate median" represents the median feerate (fee/vsize) of all mempool transactions in native units per byte. The mempool is evaluated and the feerate (fee/vsize) attached to all transactions is calculated. The median feerate of all transactions is then assessed. This metric is available to Bitcoin (BTC).

"mempool output value" represents the sum of all mempool transaction outputs in native units. The mempool is evaluated and all transaction outputs (UTXOs) are indexed. The value of all UTXOs of mempool transactions is then summed. This metric is available to Bitcoin (BTC).

"mempool output value entered 1m" represents the sum of all mempool transaction outputs in native units that have entered the mempool over the course of a 1-minute aggregation window. The beginning of this time window is noted in the "time" field of the response. The mempool is evaluated and all transaction outputs (UTXOs) are indexed. The value of all UTXOs of mempool transactions that have entered the mempool in the previous 1 minute window is then summed. This metric is available to Bitcoin (BTC). For this metric, 1 minute is representative. Other time windows may be applied.

"mempool vsize" represents the total virtual size (vsize) of all transactions in the mempool, in virtual bytes. The mempool is evaluated and all transactions within are indexed. The virtual size of all transactions is summed. This metric is available to Bitcoin (BTC).

"mempool vsize entered 1m" represents the total virtual size (vsize) of all transactions that have entered the mempool over the course of a 1-minute aggregation window. The beginning of this time window is noted in the "time" field of the response. The mempool is evaluated and all transactions within are indexed. The virtual size of all transactions that have entered the mempool in the previous 1-minute window is summed. This metric is available to Bitcoin (BTC). For this metric, 1 minute is representative. Other time windows may be applied.

"mempool vsize left 1m" represents the total virtual size (vsize), in bytes, of all transactions that have left the mempool over the course of a 1-minute aggregation window. The beginning of this time window is noted in the "time" field of the response. The mempool is evaluated and all transactions within are indexed. The virtual size of all transactions that have left the mempool in the previous 1-minute window is summed. This metric is available to Bitcoin (BTC). For this metric, 1 minute is representative. Other time windows may be applied.

FIGS. 4-11 represent exemplary interfaces illustrating alerts, according to an embodiment of the present invention. Alerts may be transmitted, communicated and/or accessed in various ways including an interface, GUI, API as well as in a SaaS arrangement. Other implementations may be realized.

Figure 4:
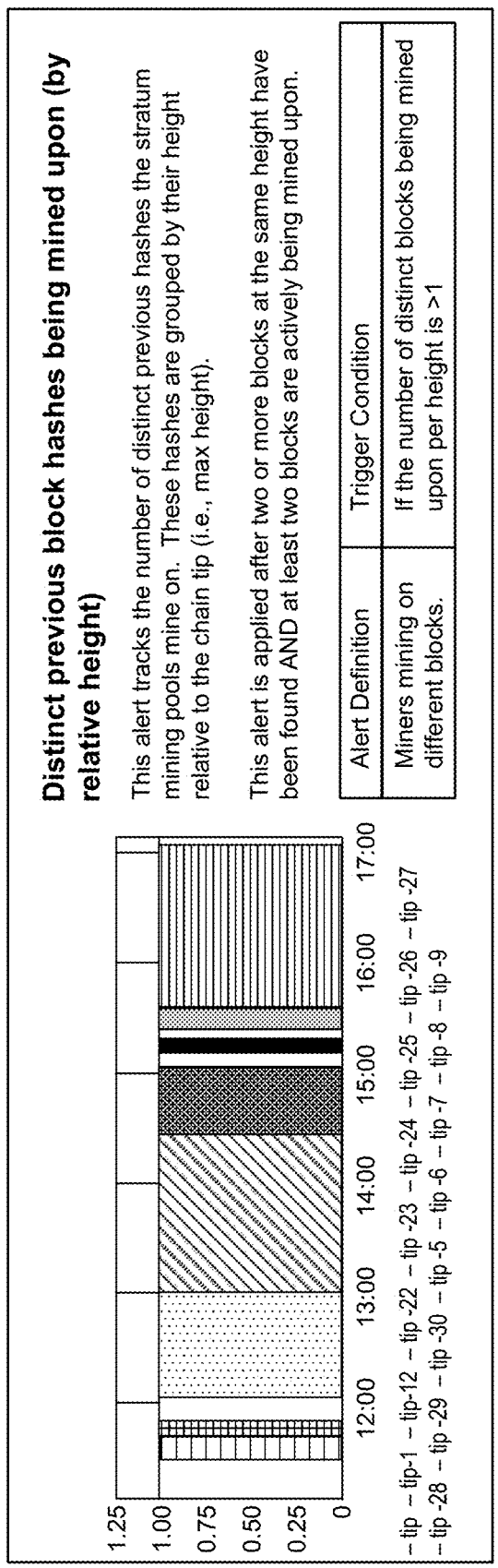
FIG. 4 is an exemplary 51% attack alert interface, according to an embodiment of the present invention.
Figure 5:
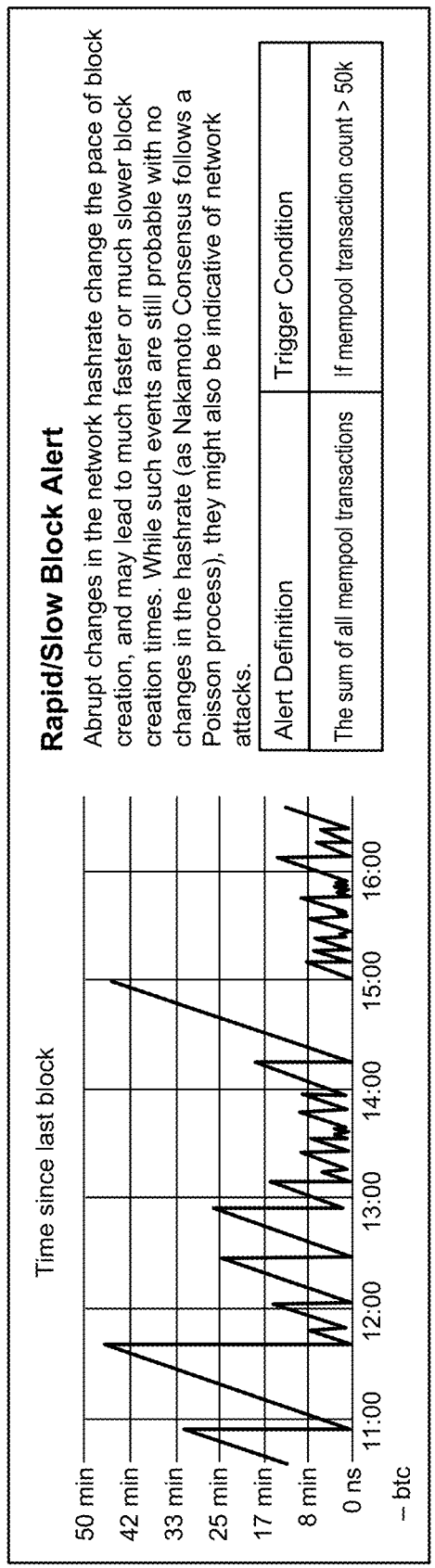
FIG. 5 is an exemplary rapid/slow block alert interface, according to an embodiment of the present invention.

As shown in FIG. 4 and FIG. 5, network attack alerts may include 51% Attack alerts, Rapid/Slow block alerts, etc.

FIG. 4 is an exemplary 51% attack alert interface, according to an embodiment of the present invention. A 51% attack alert tracks the likelihood of such attacks. In this example, the alert tracks incompatible block hashes across major mining pools and assesses asymmetries in demand for specific ASICs across major hashrate marketplaces. In this exemplary alert, inputs may include: a string of previous hashes collected from supported stratum mining pools. The alert of FIG. 4 looks at the number of previous hashes mined on by the stratum mining pools, groups them by their height relative to the chain tip (e.g., the max height) and triggers an alert if there are two or more blocks at the same height and at least two blocks are being actively mined on. As shown in FIG. 4, the alert is defined as miners mining on different blocks and the trigger condition is the number of distinct blocks being mined upon per height is greater than a threshold, such as 1. FIG. 4 includes a graphic that represents distinct previous block hashes being mined upon by relative height. In this example, "tip" represents the most recent block observed in the blockchain.

FIG. 5 is an exemplary rapid/slow block alert interface, according to an embodiment of the present invention. Abrupt changes in the network hashrate change the pace of block creation and may lead to much faster or much slower block creation times. While such events are still probable with no changes in the hashrate (as Nakamoto Consensus follows a Poisson process), they may also be indicative of network attacks. In this exemplary alert, inputs may include: UBDM data on the block at the tip of the chain. The alert of FIG. 5 tracks the time elapsed between blocks and alerts when interblock time surpasses a time threshold. As shown in FIG. 5, the alert is defined as the sum of all mempool transactions and the trigger condition is mempool transaction count is greater than a threshold number, e.g., 50k. FIG. 5 includes a graphic that represents time since last block. In this example, the graphic illustrates Bitcoin ("btc"). Other crypto networks may be illustrated.

Figure 6:
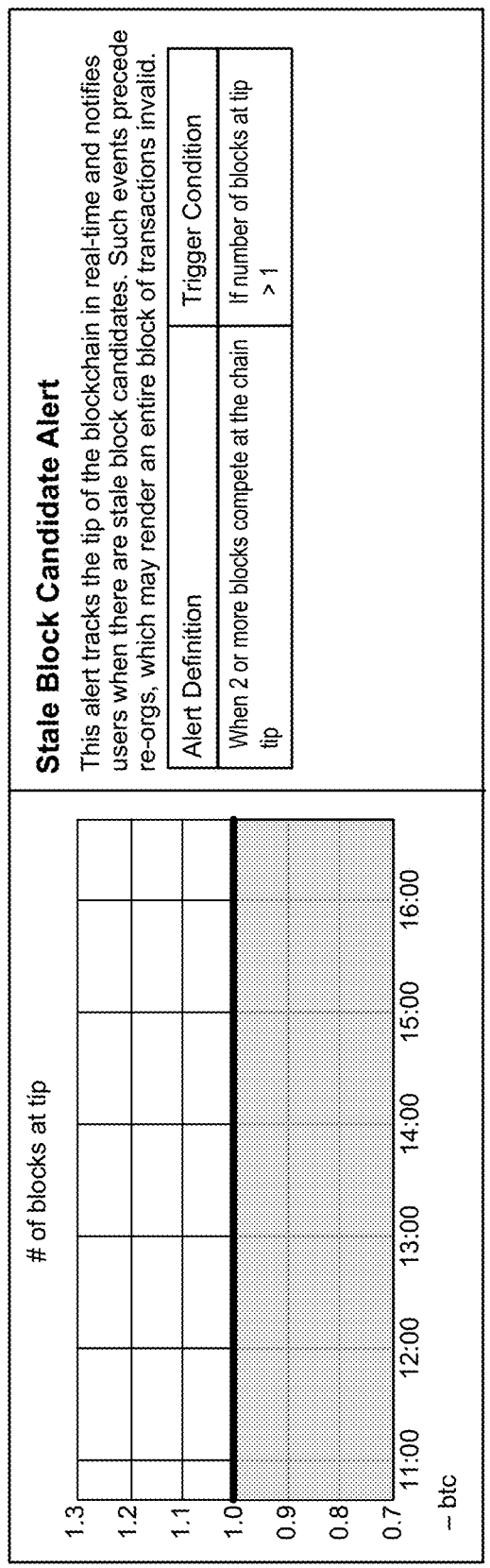
FIG. 6 is an exemplary stale block candidate alert interface, according to an embodiment of the present invention.
Figure 7:
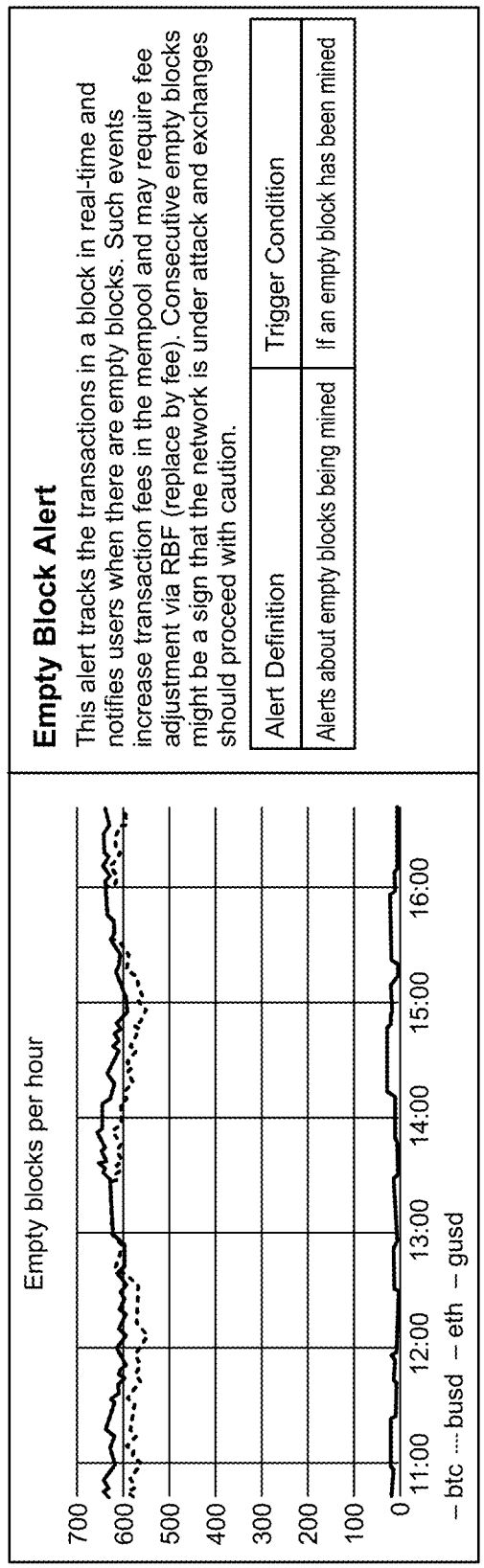
FIG. 7 is an exemplary empty block alert interface, according to an embodiment of the present invention.

As shown in FIG. 6 and FIG. 7, settlement risk alerts may relate to stale block candidates, empty blocks, and other events that prevent settlement.

FIG. 6 is an exemplary stale block candidate alert interface, according to an embodiment of the present invention. This alert tracks the tip of the blockchain in real-time and notifies users when there are stale block candidates. In this example, stale block candidates may be defined as two or more competing blockchain branches at the same height. Such events precede re-organizations, which may render an entire block of transactions invalid. In this exemplary alert, inputs may include: UBDM data on the block at the tip of the chain. The alert of FIG. 6 looks at the sum of the blocks at the tip of the blockchain and triggers an alert if 2 or more blocks are at the tip. As shown in FIG. 6, the alert is defined as two or more blocks compete at the chain tip and the trigger condition is the number of blocks at tip is greater than a threshold, e.g., 1. FIG. 6 includes a graphic that represents number of blocks at tip.

FIG. 7 is an exemplary empty block alert interface, according to an embodiment of the present invention. This alert tracks transactions in a block in real-time and notifies users when there are empty blocks. Such events increase transaction fees in the mempool and may require fee adjustment via RBF (replace by fee). Consecutive empty blocks may be a sign that the network is under attack and exchanges should proceed with caution. In this exemplary alert, inputs may include: mining pool data and UBDM data on the block at the tip of the chain. The alert of FIG. 7 looks at blocks being created at the tip of the chain and across mining pools in real-time, counts the number of transactions in each block, and triggers an alert if an empty block is mined. As shown in FIG. 7, the alert is defined as empty blocks being mined and the trigger condition is an empty block has been mined. FIG. 7 includes a graphic that represents empty blocks per hour. In this example, "btc" represents Bitcoin; "busd" represents Binance USD; "eth" represents Ethereum and "gusd" represents Gemini Dollar. Other crypto networks may be supported.

Figure 8:
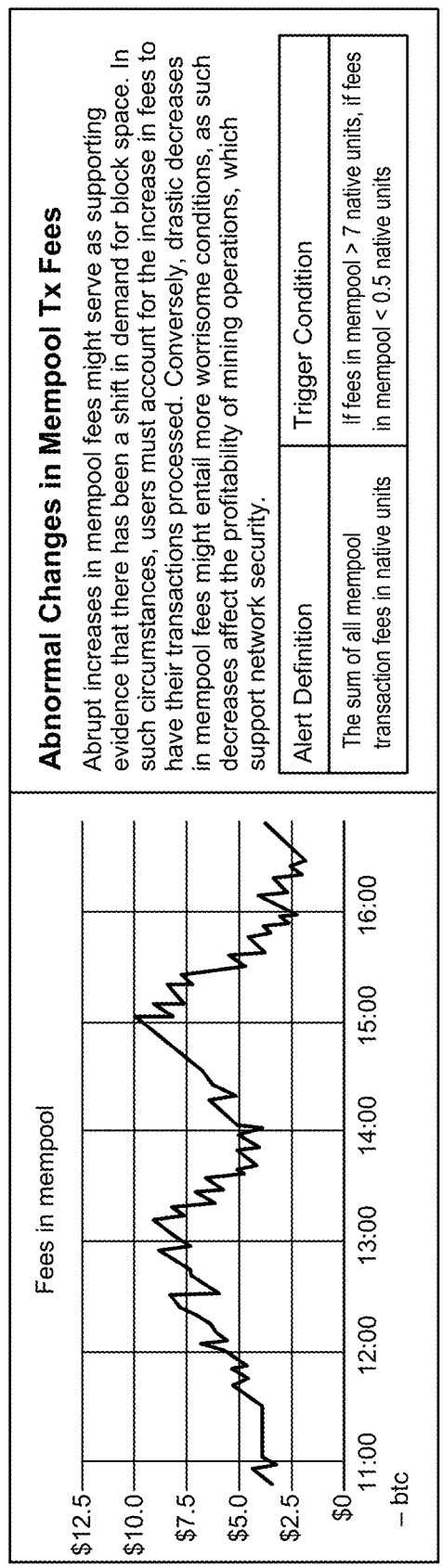
FIG. 8 is an exemplary abnormal change alert interface, according to an embodiment of the present invention.
Figure 9:
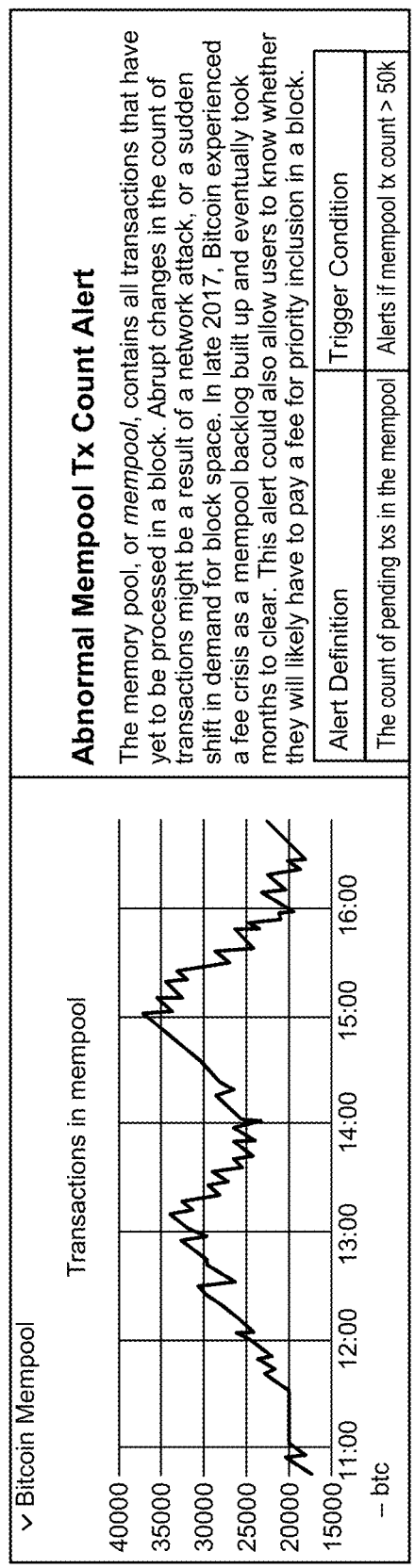
FIG. 9 is an exemplary abnormal mempool alert interface, according to an embodiment of the present invention.

As shown in FIG. 8 and FIG. 9, fee volatility alerts may relate to abnormal changes in mempool fees, abnormal mempool counts, etc.

FIG. 8 is an exemplary abnormal change alert interface, according to an embodiment of the present invention. Abrupt increases in mempool fees may serve as supporting evidence that there has been a shift in demand for block space. In such circumstances, users account for the increase in fees to have their transactions processed. Conversely, drastic decreases in mempool fees may entail more worrisome conditions, as such decreases affect the profitability of mining operations, which support network security. In this exemplary alert, inputs may include: mempool data on unconfirmed transactions. The alert of FIG. 8 looks at the sum of all transaction fees (denominated in the blockchain's native units) and triggers an alert if fees are less than a threshold, such as 0.5 native units. As shown in FIG. 8, the alert is defined as the sum of all mempool transaction fees in native units and the trigger condition is fees in mempool greater than a predetermined number of native units (e.g., 7 native units) and fees in mempool less than a predetermined threshold, e.g. 0.5 native units. FIG. 8 includes a graphic that represents fees in mempool.

FIG. 9 is an exemplary abnormal mempool alert interface, according to an embodiment of the present invention. The memory pool, or mempool, contains all transactions that have yet to be processed in a block. Abrupt changes in the count of transactions may be a result of a network attack, or a sudden shift in demand for block space. For example, a fee crisis may result from a mempool backlog which could take months to clear. This alert could also inform users as to whether they will likely have to pay a fee for priority inclusion in a block. In this exemplary alert, inputs may include: mempool data on unconfirmed transactions. The alert of FIG. 9 looks at the count of all transaction in the mempool and triggers an alert if the transaction count is above a particular threshold (in the case of Bitcoin, if it is greater than 50k). Other thresholds may be applied. As shown in FIG. 9, the alert is defined as the count of pending transactions in the mempool and the trigger condition is mempool transaction count is greater than a threshold number, e.g., 50k. FIG. 9 includes a graphic that represents transaction in mempool. In this example, the graphic represents a Bitcoin mempool.

Figure 10:
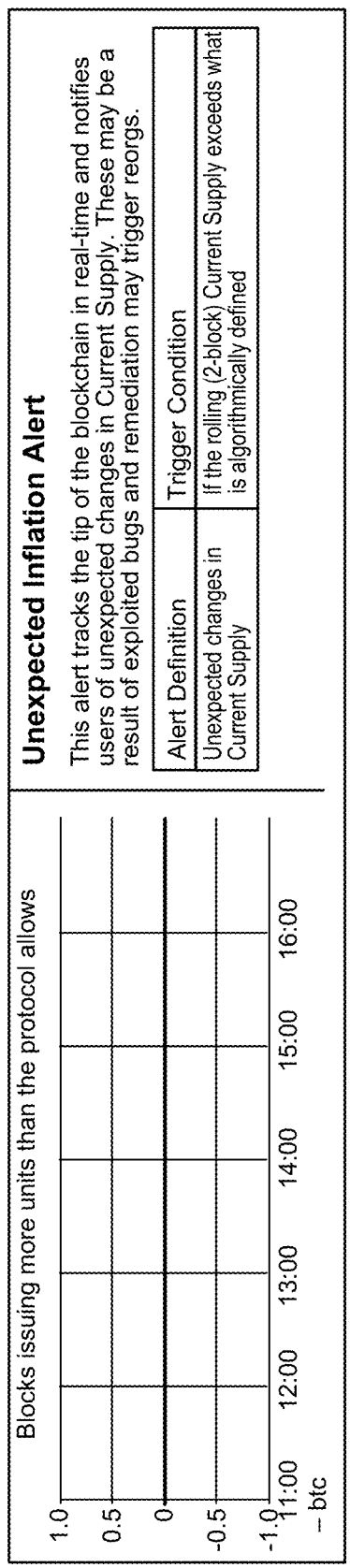
FIG. 10 is an exemplary unexpected inflation alert interface, according to an embodiment of the present invention.
Figure 11:
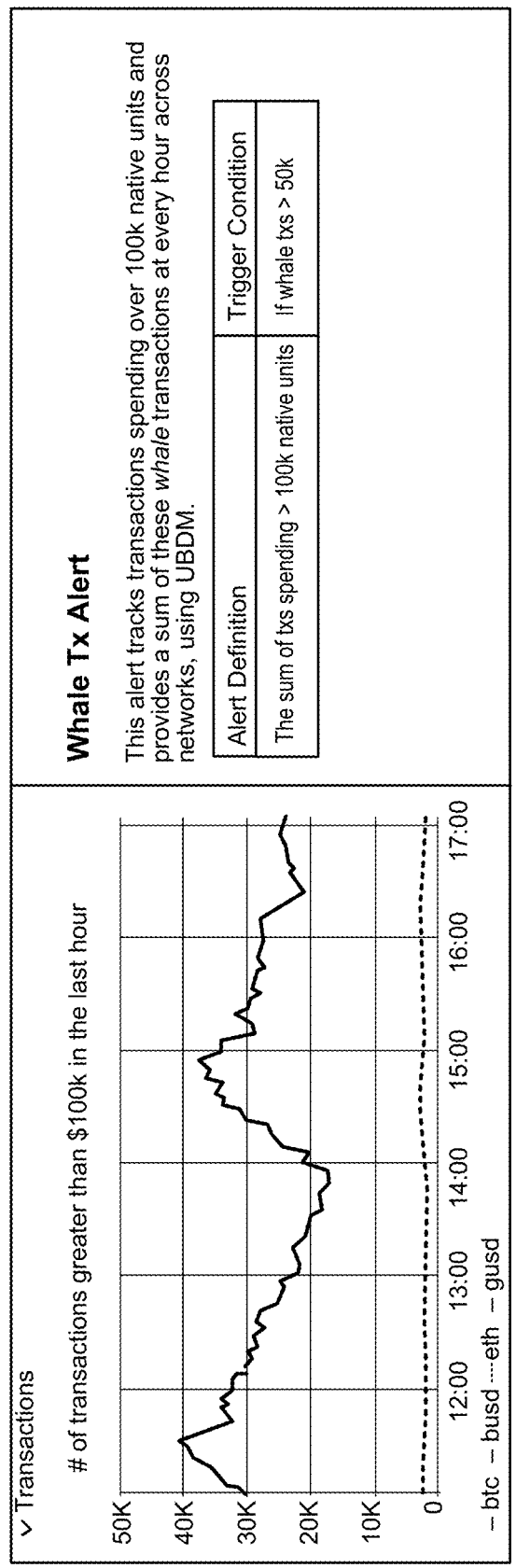
FIG. 11 is an exemplary Whale Tx alert interface, according to an embodiment of the present invention.

As shown in FIG. 10 and FIG. 11, unusual network event alerts may relate to unexpected inflations, Whale transactions and other events that have the potential to manipulate currency valuations.

FIG. 10 is an exemplary unexpected inflation alert interface, according to an embodiment of the present invention. This alert tracks the tip of the blockchain in real-time and notifies users of unexpected changes in Current Supply, which is the total number of cryptoasset monetary units that have been issued in a blockchain network. These changes may be a result of exploited bugs and remediation that may trigger reorgs. In this exemplary alert, inputs may include: UBDM data on the block at the tip of the chain. The alert of FIG. 10 looks at the blockchain current supply at the tip of the blockchain and triggers an alert if the rolling (2-block) current supply exceeds what is algorithmically defined in the blockchain source code. As shown in FIG. 10, the alert is defined as unexpected changes in current supply and the trigger condition is a rolling current supply exceeds a threshold, which may be algorithmically defined. FIG. 10 includes a graphic that represents blocks issuing more units than the protocol allows.

FIG. 11 is an exemplary Whale Tx alert interface, according to an embodiment of the present invention. Whale transactions may refer to transactions involving a large amount of crypto currency having the potential to manipulate currency valuation. This alert tracks transactions spending over 100k native units and provides a sum of these whale transactions at every hour across networks, using Coin Metric's Universal Blockchain Data Model (UBDM). In this exemplary alert, inputs may include: mempool data on unconfirmed transactions. The alert of FIG. 11 tracks transactions spending over 100k native units and provides a sum of these whale transactions at every hour across networks. As shown in FIG. 11, the alert is defined as the sum of transactions spending more than a predetermined number of native units (e.g., 100k native units) and the trigger condition is whale transactions greater than a threshold number, e.g., 50k. FIG. 11 includes a graphic that represents number of transactions greater than $100K in the last hour. Other thresholds and constraints (e.g., time or other metric) may be applied.

An embodiment of the present invention may be directed to company specific alerts. For example, by integrating with the Universal Blockchain Data Model (UBDM) 212, an embodiment of the present invention realizes an ability to "tag" addresses and monitor specific addresses, accounts, transactions, etc. An embodiment of the present invention may connect to offline systems to identify discrepancies in terms of what those systems record as legitimate transaction activity for a particular address or a set of addresses and what transactions are present in the mempool for those same addresses. In doing so, an embodiment of the present invention provides an early detection system for fraudulent activity occurring in a particular organization's accounts/ address set. In order to provide accurate ordering, a Consensus Timestamp may be applied which has the property of providing the same partial order over blocks than the height does (e.g., a block's consensus Timestamp is always greater or equal to its parent's). This provides a uniform time series that accurately reflects the ordering of transactions.

The embodiments of the present invention may be extended and applied to various use cases, scenarios, applications, etc. For example, Chain Monitor may be used in exchange and custody (including wallet) operations for precise fee estimation and optional transaction timing. This further manages settlement risk and provides users/customers with appropriate expectations around settlement.

In addition, exchanges may use the Chain Monitor to detect risk to the networks they cover and cease operations when certain events are detected, such as hidden inflation, double spent risk, etc.

With an embodiment of the present invention, real-time breaches may be detected via mempool monitoring and appropriate incident response may occur before transactions are included in blocks.

An embodiment of the present invention is directed to applying consensus risk modeling, as described in U.S. Provisional Application 63/019,135, entitled "Scalable and Advanced Analytics Computing Platform for Distributed Ledger Data," filed May 1, 2020, the content relating to consensus risk modeling illustrated in FIGS. 2D and 3C and corresponding supporting paragraphs are incorporated herein by reference. Consensus risk modeling may be applied to determine network risk and generate network attack risk alerts. For example, consensus risk modeling may be supported by Network Attack Risk Alert Module 342, as illustrated in FIG. 3.

With regard to consensus risk modeling, an embodiment of the present invention may identify, in near real-time, data related to the consensus process to validate a specific block on a given network, including the hashpower of validators and "mining pools" across the network. This data can be used to model the risk, economic cost, and likelihood for a 51% attack. In particular, for a given blockchain, the system participates in mining pools and collects data across the performance and activities of major mining pools. The system may also ingest data in real-time on actual "51%" attacks to permission-less blockchains. This data is aggregated alongside ledger and market data across a series of nodes, hosted by third parties and internally. The system may then output a blockchain risk profile, including consensus and on-chain settlement risk, to identify to cost and probability of an overall impact of a 51% (or other indications of majority) attack for a given blockchain.

Figure 12:
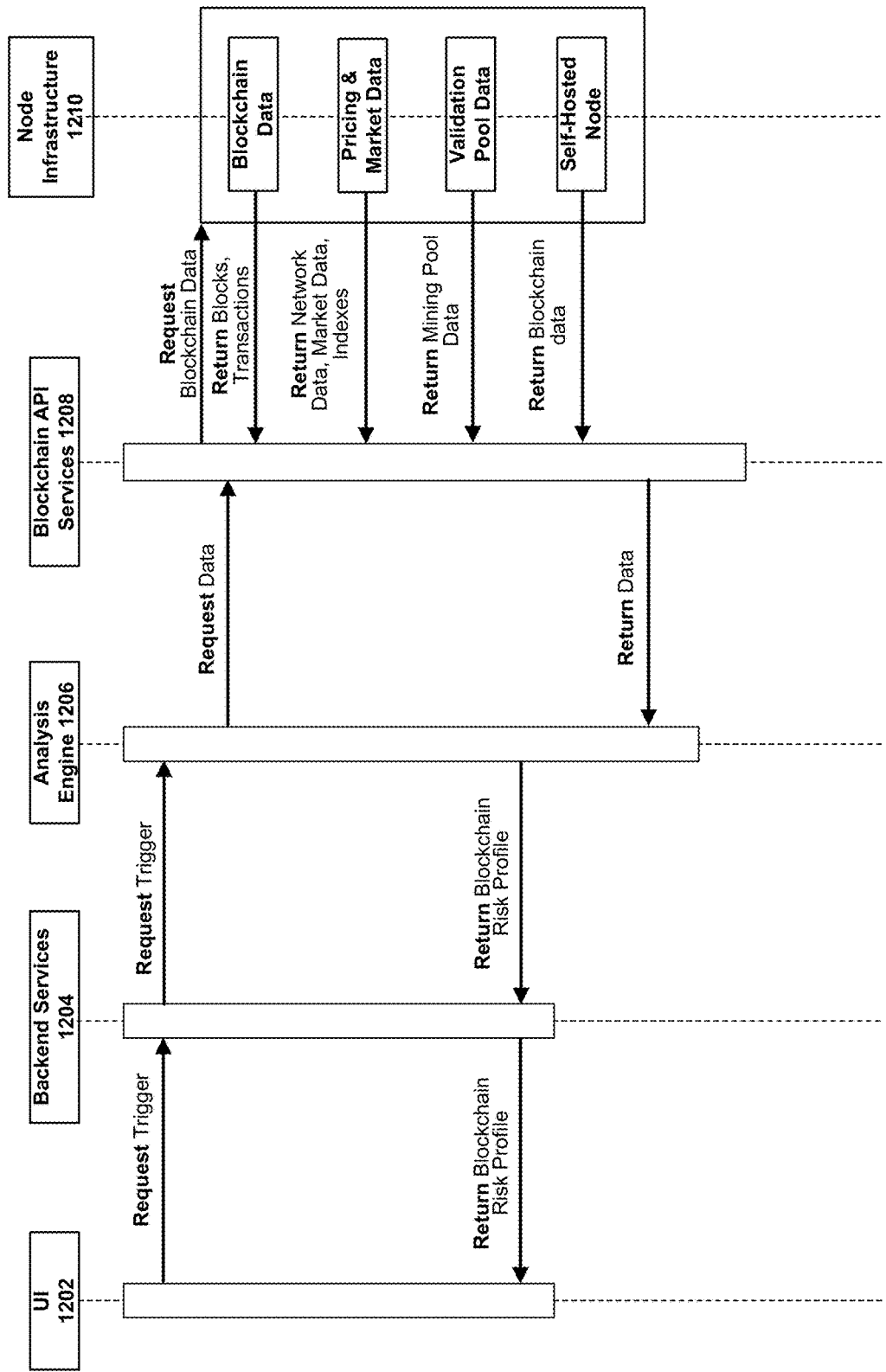
FIG. 12 is an exemplary consensus risk modeling flow diagram, according to an exemplary embodiment of the invention.

FIG. 12 is an exemplary consensus risk modeling flow diagram, according to an exemplary embodiment of the invention. As depicted in FIG. 12, a user may first send a trigger to Analysis Engine 1206 via Backend Services 1204. The user may interact with UI 1202 to initiate the trigger. The Analysis Engine 1206 may then request that Blockchain API Service 1208 retrieve a plurality of data from Node Infrastructure 1210. For example, Blockchain API Service 1208 may request a dataset for a given blockchain, upon which, Node Infrastructure 1210 would retrieve: (i) block and transaction data from Blockchain Data nodes, (ii) network, market, and indexes data from Pricing & Market Data nodes, (iii) mining pool data from Validation Pool Data nodes, and/or (iv) blockchain data from a Self-Hosted Node. According to an embodiment of the present invention, data from the mining pools may be retrieved and/or ingested by participating in mining pools and allocating computational resources to monitor the collection of transactions in the temporary memory pool (mempool), results of the consensus process, and/or subsequent validation of confirmed blocks. This data may be captured and replicated in real-time for analysis in aggregate across mining pools and consensus processes. Then, based on the retrieved data, Analysis Engine 1206 generates a blockchain risk profile, which is provided back to UI 1202, e.g., via Backend Services 1204.

Figure 13:
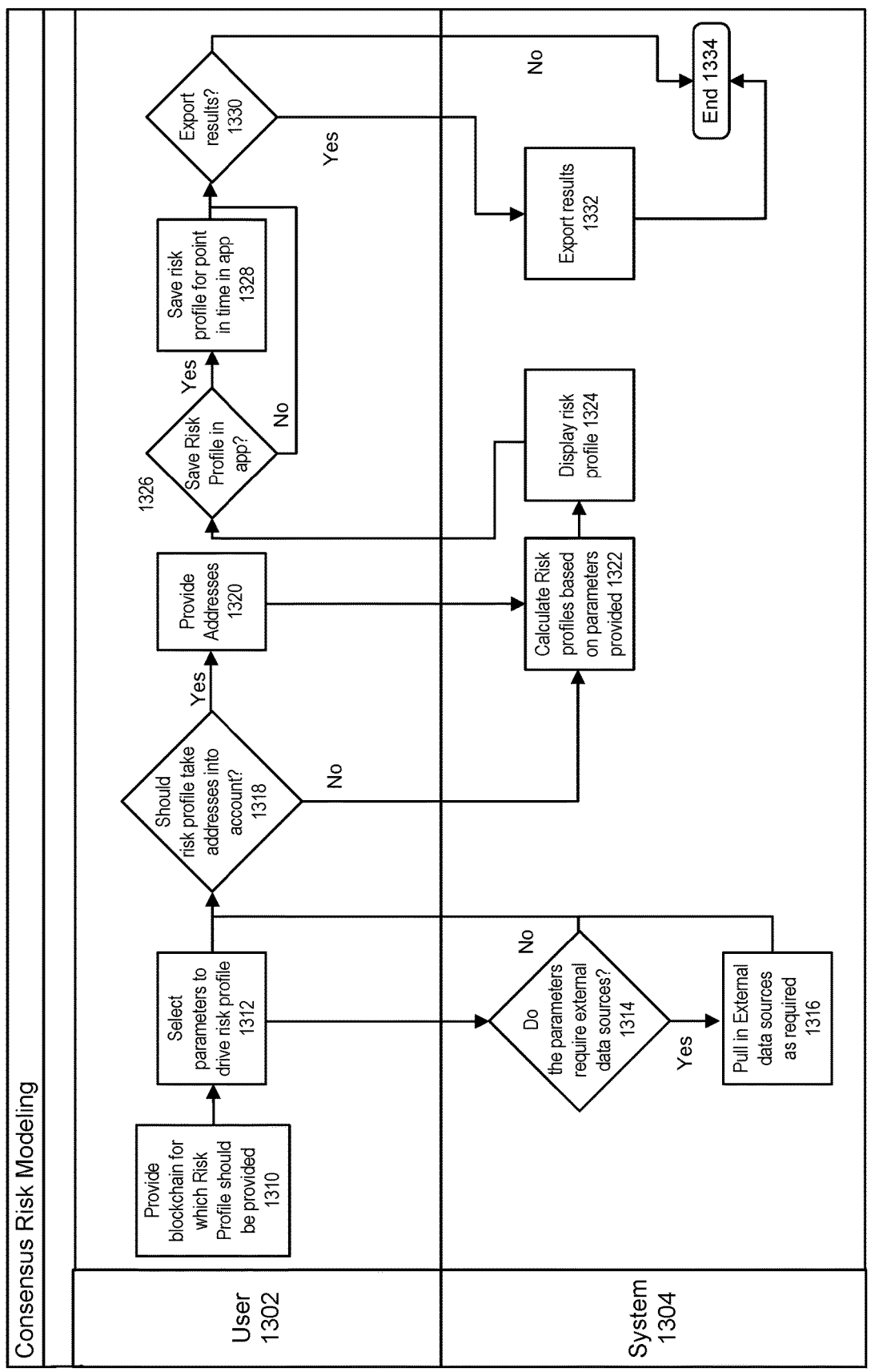
FIG. 13 is an exemplary user interaction for consensus risk modeling, according to an exemplary embodiment of the invention.

FIG. 13 is an exemplary user interaction for consensus risk modeling, according to an exemplary embodiment of the invention. According to an embodiment of the present invention, an exemplary system may use data from permissioned and permission-less distributed ledgers as well as other analytical insights in order to generate a "blockchain risk profile," which represents an aggregation of scores and amalgamated data points that can communicate to end users the impact and risk of events that could affect crypto asset holdings on the permissioned or permission-less distributed ledgers. The blockchain risk profile may inform business risk decisions, include quantitative risk measures like transaction or position-based digital settlement risk, as well as qualitative risk measures, including but not limited to sentimental analysis, qualitative research of governance proposals, and/or analysis of distributed ledger validator metadata. According to an embodiment of the present invention, in order to assess blockchain risk, a user can make a request through the UI. The system can access public blockchains to obtain information as inputs; and, after the system performs an analysis on these inputs, a series of outputs that form the blockchain risk profile are generated. Options for data points can be order book data directly from centralized marketplaces, financial institutions, exchanges, or crypto asset businesses; decentralized exchanges, order books, aggregators, or applications (otherwise known as distributed applications (dApps)); direct data from miners, blockchains, mempools, or other data sources responsive to the selection, aggregation, submission, and/or broadcast of transactions or blocks on a permissioned or permission-less distributed ledger or blockchain.

As shown in FIG. 13, during consensus risk modeling, a user can provide, via the UI, the blockchain (e.g., Bitcoin, Ethereum, etc.) for which a risk profile should be determined, at step 1310. The user can then provide, also via the UI, the parameters on which the risk profile should be calculated, at step 1312. The exemplary system may then determine if the parameters require external data sources at step 1314. If so, the system can pull in data from the external data sources, as required at step 1316. Otherwise, the user can determine if addresses should be provided for the risk profile at step 1318. If so, the user can provide the addresses directly or via a file upload at step 1320. The exemplary system can then calculate a risk profile based on the provided parameters at step 1322 and, if relevant, the provided addresses at step 1320. The system may then output the calculated risk profile to the user via the UI at step 1324.

According to an embodiment of the present invention, the risk profile may be an assortment of data points and metadata responsive to understanding the risks of a majority attack (e.g., 51% for PoW ledgers, varying thresholds for PoS and other related systems). The system can also output: miners/validators that received rewards for the most recent blocks, a percent breakdown of which mining entities have participated in block validation, a means of clustering and identifying different mining/validator entities based on data and metadata from the validator pool and respective data sources, a settlement risk, and/or a likelihood that a transaction is included in the next n blocks (e.g., overview of the number of blocks it takes for a transaction to be read from the mempool and validated on chain based on the fee paid). Further, according to an embodiment, the settlement risk can show a likelihood that a transaction is included in a block within a given timeframe defined by the user. Further, the settlement risk can also show the exposure over a given timeframe based on the transactions completed as well as the average time for a transaction to be included in a block and the time it took to credit/debit the amounts from a user account. Then, as depicted in FIG. 13, the user is provided with the option to save the risk profile to the system at steps 1326 and 1328. Further, the user is also provided the option to export the risk profile report, e.g., as a PDF document, at step 1330. The results may be exported at step 1332 and the process sends at 1334.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

The system described above can be implemented with servers and other computing devices in various configurations. The various servers and computing devices may use software to execute programs to execute the methods described above. Various embodiments of the invention also relate to the software or computer readable medium containing program instructions for executing the above described methods.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

The software, hardware and services described herein may be provided utilizing one or more cloud service models, such as Software-as-a-Service (SaaS), Platform-as-a-Service (PaaS), and Infrastructure-as-a-Service (IaaS), on premise deployments and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

It is also to be understood that the following claims are to cover all generic and specific features of the invention described herein, and all statements of the scope of the invention which, as a matter of language, might be said to fall therebetween.

What is claimed is:

1. A system for implementing blockchain network risk management, the system comprising:
a data interface that communicates with a plurality of data sources through a communication network via an application programming interface, the plurality of data sources comprising relay protocols, client nodes, mining pool protocols and hashrate rental marketplaces, the data interface further comprising a data feed interface; and
a chain monitor server coupled to the data interface and comprising a network processor, a settlement processor, a fee processor and an event processor;
the chain monitor server further comprising a computer processor programmed to perform the steps of:
receiving, via the data interface, transaction data from the plurality of data sources;
accessing, via a mempool querying engine, data relating to unprocessed transactions stored in a memory pool;
accessing, via a mining pool verifier, block hash data from a plurality of mining pools;
accessing, via a hashrate price collector, rates data from one or more hashrate rental marketplaces relating to mining supply and demand information;
based at least in part on the block hash data from the plurality of mining pools and the rates data from the one or more hashrate rental marketplaces, generating, by the network processor, a network attack risk that represents a risk of network disruption;
based at least in part on the transaction data, generating, by the settlement processor, a settlement risk that includes one or more dynamic thresholds that reflect one or more events being experienced by a network that could prevent settlement;
based at least in part on data relating to the unprocessed transactions stored in the memory pool, generating, by the fee processor, a fee volatility risk that identifies an abnormal change in one or more of: mempool transaction fees and mempool transaction count;
based at least in part on the transaction data, generating, by the event processor, a network event alert that represents unexpected inflation in real-time; and
generating, via an interactive user interface, at least one alert that represents an indication of risk comprising a combination of the network attack risk, the settlement risk, the fee volatility risk and an unusual network event risk.

2. The system of claim 1, wherein the data interface is coupled to a key risk indicator feed that represents a real-time feed comprising risk metrics wherein each risk metric relates to one or more assets and an alert type.

3. The system of claim 2, wherein a settlement risk alert module calculates a settlement risk score that reflects a likelihood of settlement in real-time based at least in part on the key risk indicator feed.

4. The system of claim 1, wherein the data interface is coupled to an at-risk transaction feed that represents transactions impacted by one or more risk factors that prevent or impair settlement.

5. The system of claim 1, wherein the chain monitor server further comprises a network watchtower processor that provides a monitoring and notification service for one or more specific transactions.

6. The system of claim 1, wherein a network attack risk alert processor generates a blockchain risk profile comprising consensus and on-chain settlement risk based on consensus risk modeling.

7. The system of claim 1, wherein the transaction data is transformed into a double entry bookkeeping format using a universal blockchain data model.

8. The system of claim 1, wherein the network attack risk represents a likelihood of a 51% attack by tracking incompatible block hashes across mining pools and asymmetries in demand across one or more hashrate marketplaces.

9. The system of claim 1, wherein a network attack alert represents a block alert that indicates one or more abrupt changes in a network hashrate wherein the block alert tracks time elapsed between blocks and alerts when an interblock time surpasses a predetermined time threshold.

10. The system of claim 1, wherein the settlement risk represents an empty block alert and a stale block candidate alert that identifies two or more competing blockchain branches at the same height and wherein the settlement risk identifies one or more specific addresses impacted.

11. The system of claim 1, wherein the network event alert represents unexpected inflations and Whale transactions involving a large amount of crypto currency.

12. A method for implementing blockchain network risk management, the method comprising the steps of:
receiving, via a data interface, transaction data from a plurality of data sources, wherein the data interface communicates with the plurality of data sources through a communication network via an application programming interface, the plurality of data sources comprising relay protocols, client nodes, mining pool protocols and hashrate rental marketplaces, the data interface further comprising a data feed interface;
accessing, via a mempool querying engine, data relating to unprocessed transactions stored in a memory pool;
accessing, via a mining pool verifier, block hash data from a plurality of mining pools;
accessing, via a hashrate price collector, rates data from one or more hashrate rental marketplaces relating to mining supply and demand information;
based at least in part on the block hash data from the plurality of mining pools and the rates data from the one or more hashrate rental marketplaces, generating, by a network processor, a network attack risk that represents a risk of network disruption;
based at least in part on the transaction data, generating, by a settlement processor, a settlement risk that includes one or more dynamic thresholds that reflect one or more events being experienced by a network that could prevent settlement;
based at least in part on data relating to the unprocessed transactions stored in the memory pool, generating, by a fee processor, a fee volatility risk that identifies an abnormal change in one or more of: mempool transaction fees and mempool transaction count;
based at least in part on the transaction data, generating, by an event processor, a network event alert that represents unexpected inflation in real-time; and
generating, via an interactive user interface, at least one alert that represents an indication of risk comprising a combination of the network attack risk, the settlement risk, the fee volatility risk and an unusual network event risk.

13. The method of claim 12, wherein a data interface is coupled to a key risk indicator feed that represents a real-time feed comprising risk metrics wherein each risk metric relates to one or more assets and an alert type.

14. The method of claim 13, wherein a settlement risk alert module calculates a settlement risk score that reflects a likelihood of settlement in real-time based at least in part on the key risk indicator feed.

15. The method of claim 12, wherein a data interface is coupled to an at-risk transaction feed that represents transactions impacted by one or more risk factors that prevent or impair settlement.

16. The method of claim 12, wherein a chain monitor server further comprises a network watchtower processor that provides a monitoring and notification service for one or more specific transactions.

17. The method of claim 12, wherein the network attack risk alert processor generates a blockchain risk profile comprising consensus and on-chain settlement risk based on consensus risk modeling.

18. The method of claim 12, wherein the transaction data is transformed into a double entry bookkeeping format using a universal blockchain data model.

19. The method of claim 12, wherein the network attack risk represents a likelihood of a 51% attack by tracking incompatible block hashes across mining pools and asymmetries in demand across one or more hashrate marketplaces.

20. The method of claim 12, wherein a network attack alert represents a block alert that indicates one or more abrupt changes in a network hashrate wherein the block alert tracks time elapsed between blocks and alerts when an interblock time surpasses a predetermined time threshold.

21. The method of claim 12, wherein the settlement risk represents an empty block alert and a stale block candidate alert that identifies two or more competing blockchain branches at the same height and wherein the settlement risk identifies one or more specific addresses impacted.

22. The method of claim 12, wherein the network event alert represents unexpected inflations and Whale transactions involving a large amount of crypto currency.

* * * * *

UNITED STATES PATENT AND TRADEMARK OFFICE
CERTIFICATE OF CORRECTION

| | | |
|---|---|---|
| PATENT NO. | : 11,907,942 B2 | |
| APPLICATION NO. | : 17/245161 | |
| DATED | : February 20, 2024 | |
| INVENTOR(S) | : Antoine J. M. Le Calvez et al. | |

It is certified that error appears in the above-identified patent and that said Letters Patent is hereby corrected as shown below:

On the Title Page

(71) Applicant: COIN METRICS INC., "Cambridge, NJ (US)" should read --Boston, MA (US)--

Signed and Sealed this
Twenty-sixth Day of March, 2024

Katherine Kelly Vidal
*Director of the United States Patent and Trademark Office*